INVENTOR
Thurlow R. Kinney

3,096,960
IMPLEMENT HOLDER
Thurlow R. Kinney, 105 Fillmore Ave.,
Endicott, N.Y.
Filed July 3, 1961, Ser. No. 121,764
2 Claims. (Cl. 248—113)

This invention relates to an implement holder and more particularly to a holder for such long-handle implements as brooms, mops, and shovels.

It is an object of the present invention to provide a device for holding an implement in a simple and efficient manner, which can be readily fastened to any surface and which will securely hold the implement by its handle so that it hangs free of the floor.

Another object of the present invention is to provide an implement holder that is attractive in appearance and which will allow the implement handle to be inserted in the holder and removed from it quickly and easily.

Still a further object of the present invention is to provide an implement holder which can be produced, packaged, and sold in large quantities at a comparatively low cost, and which can be conveniently utilized wherever needed.

Still additional objects, benefits, and advantages of the invention will become evident from a study of the following detailed description taken in conjunction with the accompanying drawing, in which.

Figure 1:
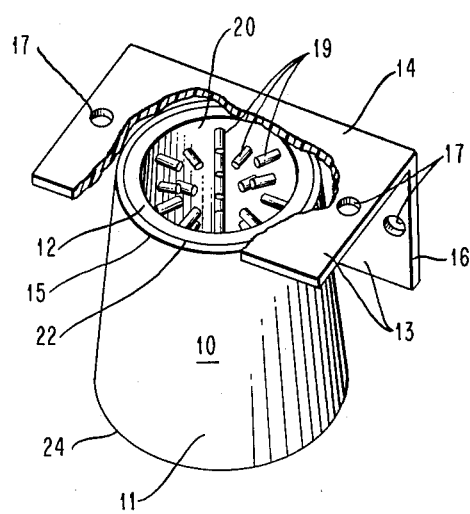
FIGURE 1 is a perspective view of an implement holder made in accordance with the present invention. The view is drawn with a portion of the horizontal surface of the mounting bracket removed to reveal the top of the retainer.
Figure 2:
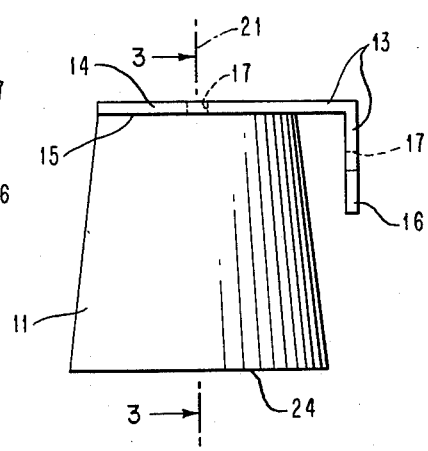
FIGURE 2 is a side view of the implement holder shown in FIGURE 1, taken along a line parallel with both the horizontal and vertical surfaces of the mounting bracket.

Referring specifically to FIGURES 1 and 2, the implement holder 10 is shown to include a retainer 11, liner 12, and mounting bracket 13. The horizontal surface 14 of the mounting bracket 13 joins the outside of the hollow frusto-conical shaped retainer 11 at the smaller end 15 of the retainer 11. The horizontal surface 14 and vertical surface 16 of the mounting bracket 13 each have two circular holes 17 in them near their outside edges to accommodate screws or nails for fastening the implement holder 10 to a horizontal or vertical surface. The frusto-conical shape of the retainer 11 allows for implement handles of different diameters. For holding implement handles of only one diameter, the retainer 11 can be cylindrical in shape. Because a cylinder can be described as a frustum of infinite altitude, the retainer 11 is still "frusto-conical." Retainer 11 and mounting bracket 13 can be constructed by moulding, casting, or machining a material such as steel or plastic (polymeric compound).

Figure 3:
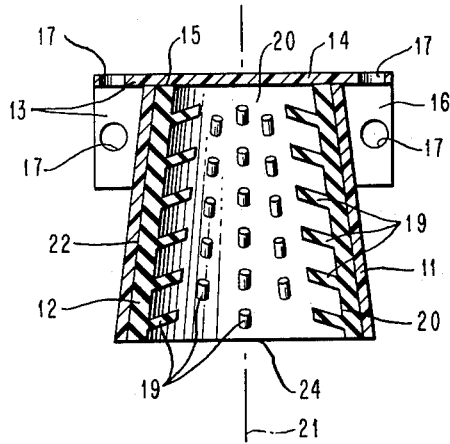
FIGURE 3 is a view of the cross section taken along line 3 of FIGURE 2, showing the interior of the device.

FIGURES 1 and 3 illustrate the liner 12. Liner 12 has numerous flexible cylindrical projections 19 on its inside surface 20. The free ends of the projections 19 point inward toward the central axis 21 of the retainer 11 and slightly upward toward the smaller end 15 of the retainer 11. The smooth outer surface of the liner 12 is bonded to the inside surface of the retainer 11 by means of a chemical adhesive at their meeting surface 22. Liner 12 is constructed by a moulding process from rubber, plastic, or other flexible material which is sufficiently soft to yield to an implement handle without scratching it.

Figure 4:
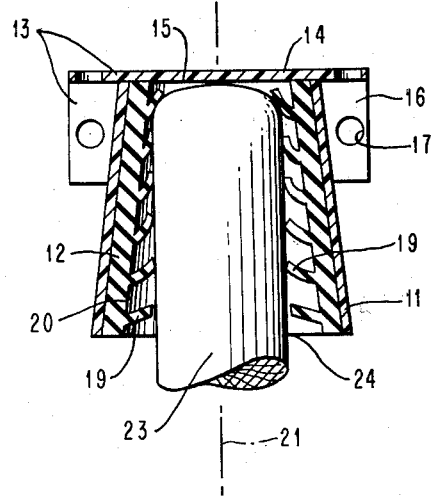
FIGURE 4 is a similar view of the cross section shown in FIGURE 3, showing the device in actual use.

The operation of the invention is illustrated in FIGURE 4. An implement handle 23 is inserted in the open larger end 24 of the retainer 11 and the handle 23 is pushed upward. As the handle 23 moves upward and presses against the tips of the flexible projections 19, it bends them upward and away from the central axis 21 of the retainer 11. When the handle is released, the weight of the implement tends to pull the handle 23 downward, and the friction between the tips of the flexible projections 19 and the handle 23 causes the tips to follow the motion of the handle 23. In order to move downward, the tips of the flexible projections 19 must also move inward toward the central axis 21 of the retainer 11. The net result is for the tips of the flexible projections 19 to press firmly against the handle 23 and hold it in the retainer 11. Releasing the handle 23 from the implement holder 10 is done by twisting the handle 23 about its longitudinal axis while pulling it downward. The twisting motion bends the tips of the flexible projections 19 sideways, reducing the friction between the tips and the handle 23 so that the handle 23 can slide downward and out of the retainer 11.

While this invention has been described with particular reference to the construction shown in the drawing and while various changes may be made in the details of construction, it shall be understood that such changes shall be within the spirit and scope of the present invention as defined by the appended claims.

Having thus completely and fully described the invention, what is now claimed as new and desired to be protected by Letters Patent of the United States is:

1. An implement holder for engaging the free end of a rod-type implement and thus securing the implement for storage, comprising:
   (a) a hollow frusto-conical member having an inside surface dimensioned to allow passage of the implement handle through a significant portion of the length of said frusto-conical member along an axial path; and
   (b) a multiplicity of flexible elongated rodlike projections extending inwardly from a major portion of the inside surface of said frusto-conical member, said projections pointing slightly upward toward the apex end of said frusto-conical member, said projections being adapted for easy deformation toward their normal attitudes toward the apex end of said frusto-conical member as an implement handle is inserted but resisting direct removal of the implement handle due to compression and friction as they are returned toward their normal attitudes, and said projections resisting removal of the implement handle by only a downward pull of it but allowing removal of the implement handle by a downward pull accompanied by a radial twisting motion which allows deformation of said projections away from the apex end of said frusto-conical member without passing through their normal attitudes.

2. An implement holder for engaging the free end of a rod-type implement and thus securing the implement for storage, comprising:
   (a) a hollow frusto-conical retainer member;
   (b) mounting bracket means associated with said frusto-conical member to allow secure mounting of the implement holder to a surface;
   (c) a hollow flexible rubber frusto-conical liner secured within said retainer member; and
   (d) a multiplicity of flexible elongated projections of rodlike nature extending inwardly from a major portion of the inside surface of said frusto-conical member, said projections pointing slightly upward toward the apex end of said frusto-conical member, said projections being adapted for easy deformation from their normal attitudes toward the apex end of said frusto-conical member as an implement handle is inserted but resisting direct removal of the implement handle due to compression and friction as they are returned toward their normal attitudes, and said projections resisting removal of the implement handle by only a downward pull of it but allowing removal of the implement handle by a downward pull accompanied by a radial twisting motion which allows deformation of said projections away from the apex end of said frusto-conical member without passing through their normal attitudes.

References Cited in the file of this patent

UNITED STATES PATENTS

| | | |
|---|---|---|
| 2,561,611 | Buchanan | July 24, 1951 |
| 2,661,610 | Treff | Dec. 8, 1953 |

FOREIGN PATENTS

| | | |
|---|---|---|
| 275,377 | Switzerland | August 1951 |